July 7, 1925.
W. J. DAVIS ET AL
1,545,309
AUTOMATIC BELT GUIDE
Filed May 2, 1924
Fig.1.
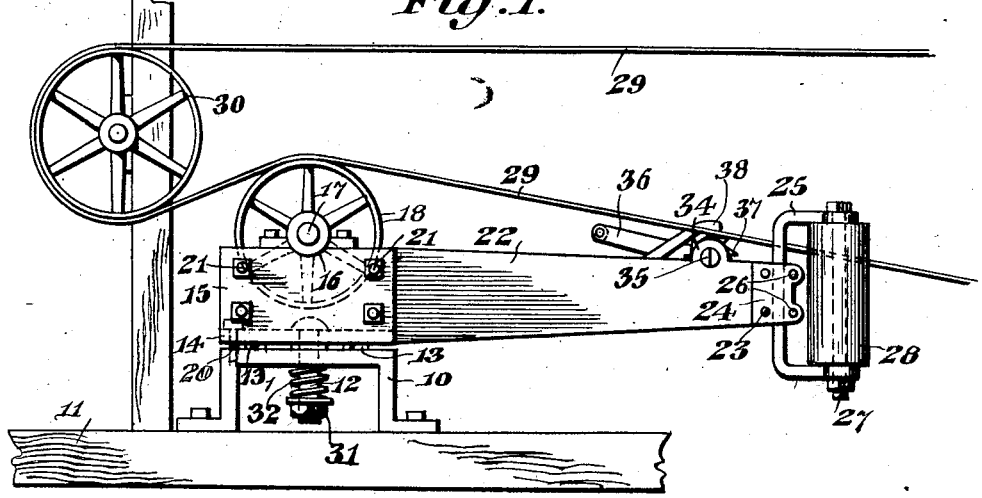
Fig.2.
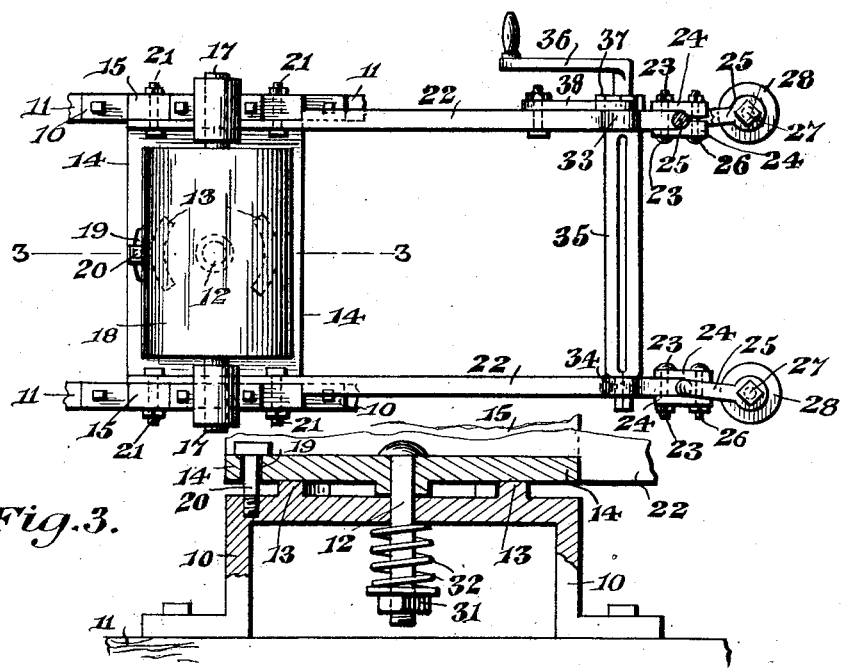
Fig.3.
Fig.4.
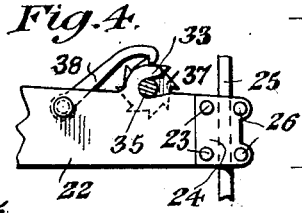
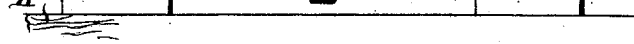
William J. Davis, INVENTORS
Harry Truax,
BY
Geo. F. Kimmel
ATTORNEY.

Patented July 7, 1925.

1,545,309

UNITED STATES PATENT OFFICE.

WILLIAM J. DAVIS AND HARRY TRUAX, OF BATAVIA, NEW YORK.

AUTOMATIC BELT GUIDE.

Application filed May 2, 1924. Serial No. 710,585.

*To all whom it may concern:*

Be it known that we, WILLIAM J. DAVIS and HARRY TRUAX, citizens of the United States, residing at Batavia, in the county of Genesee and State of New York, have invented certain new and useful Improvements in Automatic Belt Guides, of which the following is a specification.

This invention relates to combined guides and supports for endless drive belts, to prevent lateral displacement from any cause, more particularly to belts exposed to lateral pressure from the wind, for instance the belts employed for operating threshing machines and the like, and has for one of its objects to improve the construction and increase the efficiency and utility of devices of this character.

Another object of the invention is to provide a device of this character having means for adjustment to adapt it to belts of varying widths.

With these and other objects in view the invention consists in certain novel features of construction as hereinafter shown and described and then specifically pointed out in the claims, and in the drawings illustrative of the preferred embodiment of the invention.

Figure 1 is a side elevation of the improved device, applied to a belt.

Figure 2 is a plan view partly in section, without the belt.

Figure 3 is an enlarged transverse section on the line 3—3 of Figure 2.

Figure 4 is a detail illustrating the construction of the winding shaft holding device.

The improved device comprises a base or support 10 adapted to be attached to a suitable foundation, for instance a part of the framework of a threshing machine and indicated at 11.

The upper face of the member 10 is flat, and is apertured to receive a centering pin 12, and with segmental wear ribs 13 and mounted for oscillation on the pin 13 is a bracket device comprising a flat lower portion 14 bearing upon the wear ribs 13, and with upstanding spaced end portions 15, each with a half bearing 16 in its upper face to support a shaft 17, the latter carrying an idler pulley 18.

Formed through the bottom member 14 of the bracket is a segmental slot 19, and a stop pin 20 extends through the slot and is tapped into the base 10, the slot and pin coacting to limit the oscillatory movement of the bracket and its roller or pulley 18.

Attached at 21 to the upstanding portions 15 of the bracket are spaced side members or arms 22 extending in parallel relation away from the bracket device.

Attached at 23 to the side faces of the side members 22 at their free ends are clamp members 24 having half bearings in their confronting faces to receive U-shaped hanger members 25. Clamp bolts 26 operate through the clamp members 24 in advance of the hanger members, to enable the clamp members to be rigidly compressed against the hanger members to lock them in adjusted position.

Extending through the upper and lower portions of the hanger members 25 are pins 27, each carrying a bearing roller 28.

The belt with which the improved device is associated is represented conventionally at 29 and passes around a drive pulley 30 with the lower section of the belt bearing over the idler pulley 18 and between the lateral guide rollers 28.

The pin 12 extends for a considerable distance below the lower face of the support 10 and is provided with an adjusting nut 31 and compression spring 32, and cooperating to yieldably hold the bracket from oscillatory movement, and thus prevent it from being too easily moved.

By this simple arrangement the belt 29 is guided and prevented from being swayed laterally from any cause, for instance by the wind when employed upon the relatively long drive belts of threshing machines and the like, and is adjustable to adapt it to belts of varying widths, as before described.

Formed in the upper edge of each of one of the members 22, is a closed bearing 34, and formed in the upper edge of the other member 22 is an open or hook shaped bearing 33.

Rotatably supported in the bearings 33—34 is a longitudinally divided shaft 35, with the division extending through one end with the divided end engaging in the closed bearing 34, as shown. The member 35 is provided with a turning handle 36. Mounted on the split shaft externally of the open bearing 33, is a ratchet 37 and a hooked pawl 30, to engage the ratchet. The pawl operates to prevent the shaft 35 from retrograde movement and also to hold the shaft in the open bearing 33.

When the belt is not to be used, the pawl 38 is released and the divided shaft 35 removed from its bearings and passed over one side of the belt, then restored to the bearings and the pawl again engaged with the ratchet. The belt is then removed from its driving and driven pulleys and the member 35 rotated by its handle 36 to wind the belt upon the member 35 as a drum. By this means the belt is disposed in convenient position for transportation or storage.

The improved device is simple in construction, can be manufactured of any suitable material and of any required size to adapt it to the size of the belt with which it is associated.

Having thus described the invention, what is claimed as new is:

1. In an apparatus of the class described, a supporting base, a body mounted for oscillation on said base and having upwardly directed terminals provided with shaft bearings, a shaft carrying an idler roller supported in said bearings, an arm extending from each of said upwardly directed portions, clamp members attached to the opposite sides of each of said arms and having recesses in their confronting faces, a U-shaped hanger swingingly supported to swing in a horizontal plane respectively in said recesses and each carrying a guide roller, and means for compressing said clamp members against said hangers to hold the same in adjusted position.

2. In an apparatus of the class described including spaced arms coupled to swing laterally, an idler roller movable with said arms, clamp members attached respectively to the opposite faces of said arms at their free ends, said clamp members having recesses in their confronting faces, hanger devices bearing respectively in said recesses, a bearing roller mounted for rotation in each of said hanger devices, and means for compressing the clamp members against the hanger devices to hold them in adjusted position.

In testimony whereof, we affix our signatures hereto.

WILLIAM J. DAVIS.
HARRY TRUAX.